United States Patent
Solloway et al.

(10) Patent No.: US 6,708,324 B1
(45) Date of Patent: Mar. 16, 2004

(54) EXTENSIBLE AUTOMATED TESTING SOFTWARE

(75) Inventors: Jeffrey P. Solloway, Raleigh, NC (US); Jay W. Yang, Orinda, CA (US); Ying He, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/344,317

(22) Filed: Jun. 24, 1999

(51) Int. Cl.[7] .................................................. G06F 9/44
(52) U.S. Cl. ...................................................... 717/124
(58) Field of Search ................................ 717/124, 126, 717/127, 131, 120, 115; 709/104, 107; 714/37, 38, 45

(56) References Cited

U.S. PATENT DOCUMENTS

| | | | |
|---|---|---|---|
| 5,367,635 A | | 11/1994 | Bauer et al. ................. 395/200 |
| 5,475,843 A | * | 12/1995 | Halviatti et al. ................ 717/4 |
| 5,561,769 A | | 10/1996 | Kumar et al. .......... 395/200.05 |
| 5,754,760 A | * | 5/1998 | Warfield ....................... 714/38 |
| 5,790,851 A | * | 8/1998 | Frank et al. ................. 709/104 |
| 5,974,532 A | | 10/1999 | McLain et al. ............. 712/208 |
| 5,974,572 A | * | 10/1999 | Weinberg et al. ............. 714/47 |
| 6,243,862 B1 | * | 6/2001 | Lebow ........................... 717/4 |
| 6,304,982 B1 | * | 10/2001 | Mongan et al. ............... 714/38 |
| 6,308,146 B1 | * | 10/2001 | La Cascia, Jr. et al. ....... 703/22 |

FOREIGN PATENT DOCUMENTS

EP 0 567 217 10/1993 ........... H04L/12/46

OTHER PUBLICATIONS

Microsoft Press Computer Dictionary, Third Edition. 1997. Microsoft Press. p. 33, 112, 456.*
Chadba et al. Automated Test Generation For Improved Protocol Testing. IEEE. 1995. pp. 167–171.*
Ono et al. Automated Testing System for Switching Systems with Multiple Modules. IEEE. 1997. pp. 236–240.*

* cited by examiner

Primary Examiner—Wei Zhen
(74) Attorney, Agent, or Firm—Thelen Reid & Priest, LLP; Marc S. Hanish (57) ABSTRACT

Extensible automated testing software provides reliability, user extendibility, scalability, and multiple simultaneous testing support through the use of modules which the user may employ to set up and run test scripts. One or more job files are passed to an execution harness, which then starts a System Runner Process on a host specified in the one or more job files if one has not already been started. A connection is then made between the execution harness and the system runner process and one or more Test Runner Processes are spawned. These Test Runner Processes may be spread out over various hosts. Each of these Test Runner processes calls procedures to execute one test script at a time. Since multiple instances of the software may be run simultaneously, this allows the software to properly manage multiple tests running on multiple hosts being executed by multiple users.

97 Claims, 2 Drawing Sheets

EXTENSIBLE AUTOMATED TESTING SOFTWARE

BACKGROUND OF THE INVENTION

1. Field of the Invention

The present invention relates to the field of product testing. More specifically, the present invention relates to testing software for the automatic testing of products, which is also extensible to allow for new and modified products.

2. The Background

Development and testing of computer-related products, including software, computer chips, network routers, etc. is a costly and time consuming process. Generally, computer-related products are tested using one or more software test routines, where test input is fed to the product and the output is examined to determine if the product performs as expected. Testing software, however, has become more advanced in recent years and now may allow testers to perform extremely complex tests of their products, including things like alteration of internal settings, simulation of random external events, and formatting of output results.

One problem with testing software, however, is that it generally must be designed specifically for the product being tested. Thus, a product manufacturer must first spend time and money to create a product, then spend more time and money to create test software to properly test the product. Since many manufacturers produce multiple products, creating testing software for each of these individual products can be a daunting task, sometimes requiring a special division within the manufacturing company set aside solely to write software used to test products.

An additional problem with testing software is that it often must be run manually. The testing software needs to be executed on specific modules or portions of the product, and therefore a human tester must "feed" the software into the product being tested, either by manually executing the software on the product or by providing inputs to a testing program so that it may determine which test to run and on which portion of the product. This can be very time consuming for a tester.

In the past, a modest amount of automation has been added to this process, generally in the form of batch files, where a user specifies a list of test files to be fed as input to a testing program and then a computer takes over and performs the tests with no further user interaction. These attempts at automation have suffered, however, from non-scalability (entirely new software must be created if products are redesigned, upgraded, or changed), inability to have user extendibility (generally only a single user or department is familiar with how the test software is designed, so other users in other departments cannot utilize the same software or even modify it for their needs, and inability to properly maintain reliability (again, since only single user or department are familiar with the test program and they are specifically designed for single products, any alteration of any of these facets creates instability in the program which must itself be tested before using it to test a product).

Additionally, as stated earlier, many manufacturers now have entire divisions within their company dedicated solely to test products. It is commonplace for multiple computers (hosts) to be used in testing, and for more than one of the users to be testing products at the same time. Batch files alone cannot aid in the management of these multiple processes spread over multiple machines.

What is needed is a system which allows for an automation environment for testing software which allows for scalability, user extendibility, and maintainability, as well as the management of multiple simultaneous processes.

SUMMARY OF THE INVENTION

Extensible automated testing software provides reliability, user extendibility, scalability, and multiple simultaneous testing support through the use of modules which they user may employ to set up and run test scripts. One or more job files are passed to an execution harness, which then starts a System Runner Process on a host specified in the one or more job files if one has not already been started. A connection is then made between the execution harness and the system runner process and one or more Test Runner Processes are spawned. These Test Runner Processes may be spread out over various hosts. Each of these Test Runner processes calls procedures to execute one test script at a time. Since multiple instances of the software may be run simultaneously, this allows the software to properly manage multiple tests running on multiple hosts being executed by multiple users.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons after review of this disclosure.

In accordance with a presently preferred embodiment of the present invention, the components, processes and/or data structures are implemented using computer software. Different implementations may be used and may include other types of programming languages, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

The present invention may be implemented using a computer language known as Tool Command Language (TCL). TCL is an interpreted script language that may be used to develop a variety of applications, including graphical user interfaces, prototypes, and other scripts. Individual testers may create test scripts for testing a specific product or portion of a protocol. These scripts may be written using TCL. This is the extent of the individuality required for each piece of testing software for every product. A common backbone is provided which allows for the automation, extendibility, and maintainability of the test scripts. While individuals still must spend some time interpreting the results and resolving test failure, the present invention greatly improves the automation of testing of products.

Since TCL is a common scripting language that is currently used when writing individualized test scripts, the present invention allows for backward compatibility with these pre-existing test scripts. Additionally, new scripts may be written as well. Each test script exercises a specific feature of a software or hardware product. Since TCL is used, included within the present invention may be a TCL language interpreter.

The present invention may be referred to throughout this document as an Extensible Automated System (EASY). However, alternative embodiments may be implemented in such a way that this name may be somewhat misleading. Therefore, use of this name throughout the document is not intended to limit the embodiments in any way.

Figure 1:
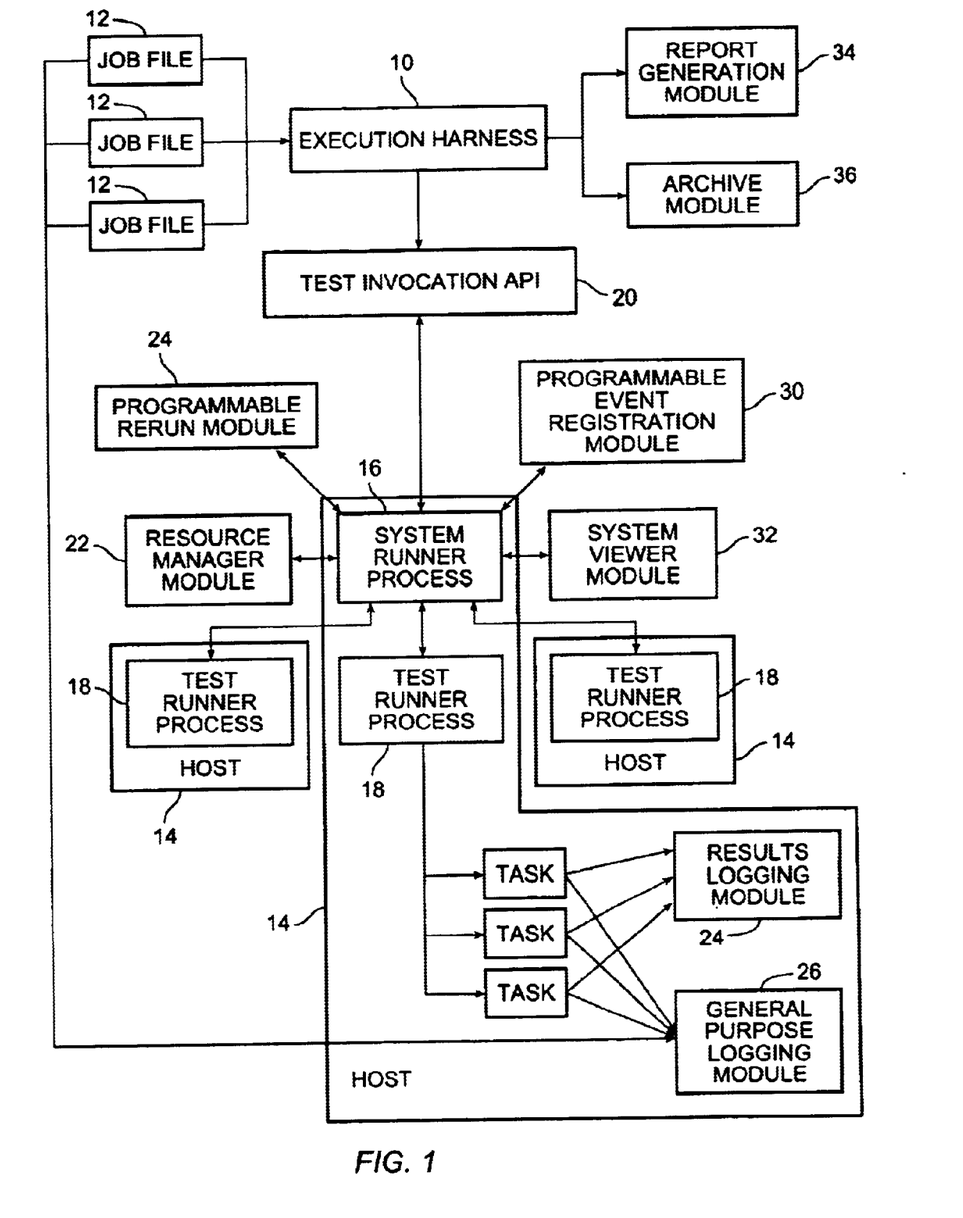
FIG. 1 is a block diagram of a modular representation of a presently preferred embodiment of the present invention.

FIG. 1 is a block diagram of a modular representation of a presently preferred embodiment of the present invention. An execution harness 10 is provided. This execution harness, commonly referred to as the wrapper program, is the mechanism by which a user invokes a test run. The execution harness receives as input one or more job files 12. The job file or files contain the names of each test to be run as well as parameters which may be needed in the running of the test or tests. There is no strict requirement as to the format of these job files. For example, a single job file may contain test names and parameters for multiple tests or multiple job files may contain information only about a single test. The test scripts themselves may also be contained in files that may be referenced during the invocation of EASY. The execution harness 10 may be a TCL program that the user may invoke from a Unix shell command prompt, chron job, or GUI front end, among others.

The tests themselves may be run on one or more hosts 14. The parameters listed in the job file or files 12 may indicate how to coordinate the hosts 14. The execution harness determines if a System Runner Process (SRP) 16 is running on a particular host, The System Runner Process handles the actual connection management, remote/local task execution, task scheduling, resource management, message handling for support processes, task status for real-time querying purposes, and synchronous, asynchronous, parallel, and same process task execution. Generally, each invocation of EASY will require only one SRP, however EASY may frequently be invoked multiple times (for example, multiple users sharing the same set of hosts). Only one SRP needs to be running per host, even if that host is being used by multiple invocations of EASY. If an SRP is not running, one is started, otherwise the harness tries to establish a connection to the running SRP.

The SRP may then spawn one or more Test Runner Processes (TRPs) 18 on one or more of the hosts in line with the user's parameters dictated in the job files 12. The TRPs actually run the tests themselves (in the form of the test scripts), using the data in the job files. The TRPs 18 may be invoked on either the local host (the same host as the SRP 16) or on other, remote hosts. When the connection is established to the SRP 16, a resource file is read which indicates the number of Test Runner Processes (TRPs) 18 to start and on which host(s) they should be started on. Upon successful completion of the startup procedures, the following procedures may be running:

one SRP running on the local host
   one TRP running on the local host
   one TRP on each of the remote hosts specified in the resource file.

Many different modules may be utilized as part of the present invention. These modules are known as APIs. Each API may address a specific system requirement. These APIs are the primary interface between the user environment and the core of the EASY system. Through the use of APIs, commands are issued to the SRP which dictate what activities should be executed. The following APIs may be available:

Test Invocation API
   Resource Management API
   Programmable Re-run API
   General Logging API
   Results Logging API
   Event Registration API
   General pause/resume API
   Report Generation API
   Archive API
   System Viewer API
   Each of these APIs will now be discussed.

The Test Invocation API 20 is the primary mechanism by which a user may define a test execution scenario. The procedures supplied by this API will be utilized within the job file. Within EASY, there are 2 forms of task invocation, direct and support. The direct form of task invocation is used to issue a specific request to schedule a task for execution. The support form of task invocation is used to alter the behavior of the system. In both cases, EASY may provide the user with a single command to issue these requests (ats_run). All of the ats_run sub-commands use the same syntax, namely:

ats_run<sub-command><options><task name><parameters>

All ats_run commands are issued through a job file.

The direct sub-commands are used to issue a specific task execution request within EASY. There are currently 4 types of supported requests, each corresponding to a unique sub-command:

| REQUEST | SUB-COMMAND |
| --- | --- |
| Synchronous | -sync |
| Asynchronous | -async |
| Parallel | -par |
| On process | -on_proc |

Designed within each of these command types is the ability to distribute task execution. This can be accomplished by simply issuing a command line option-host<hostname>.

Synchronous task execution may be the default operation. This command will block execution of the job file until the command requested has completed. Asynchronous task execution, on the other hand, will return immediately for further processing of the job file. A task handle will be returned, which may be used for task query purposes. Parallel task execution does not return until all tasks submitted for execution have finished. A list of task handles will be returned, one for each task executed. Similar to all the commands, these handles may be used for task query purposes. The On Process sub-command is used for specifying the synchronous execution of a task on a specified process. The process name is simply a unique string that the user wishes to associate with a process. This command will not return until the program has finished. The process that was created to execute this task will remain so that future programs can be run on the same process and have access to the same TCL data structures. A task handle is also returned for task query purposes.

All of the direct sub-commands may contain the same command line options, to simplify usability, maintainability, and implementation. These are: -host<host name>, -delay<value>, and -tid<task id>. The purpose of the -host option is to provide the mechanism for distributing task execution. By default, the specified task is executed on the local host (the host in which the job file was invoked). The host name parameter specifies the name of the host in which the task is to be invoked. In a presently preferred embodiment of the present invention, the host specified in the -host option must be declared in the USER.cfg file. If for some reason this host name cannot be reached, a warning message will be displayed and the task will be executed on the local host. It is also preferred that every attempt is made to execute a task even though specific requests cannot be fulfilled.

The purpose of the -delay option is top provide the mechanism for staggering task execution over time. By default, the specified task is executed with a delay of zero.

The purpose of the -tid option is to provide the mechanism for uniquely identifying a task. By default, if no task identifier is specified, EASY will generate one. This generated id will have the form _testif# where the "#" sign represents a unique number starting at 0. Although this option is not required, it most cases it will be utilized as it facilitates the usage of "real-time" task status querying.

The support sub-commands are used to issue behavioral changes to EASY. There are 2 support sub-commands: -wait and -query. The -wait subcommand is used to suspend processing of a job file until the requested task finishes or the user specified timeout period expires. If the user did not specify a timeout period, a default of 30 minutes may be used. The interval, time delayed between status inquiries, has a default value of 30 seconds. The user may not be able to make this value any lower, however increasing this value is acceptable. The actual number of status inquiries is calculated internally by dividing the timeout by the interval. This command must be issued after a series of asynchronous tasks have been submitted. If this command is not used and the job file terminates, unpredictable results will be obtained. The syntax of the -wait sub-command is:

ats_run -wait [-timeout<value in seconds>]
      [-interval<interval value>]
      <list of task handles>

The -query sub-command has been supplied for the sole purpose of allowing a user to obtain task status information from within the job file. The syntax of the -query sub-command is ats_run -query<task handle><keyword>. Supported keywords include status (get test state information), startTime (time task began executing), endTime (time task finished executing), retVal (the returned value from the script), tclError (indicates whether a Tcl error was encountered), and tclErrorMsg (contains the Tcl error message returned).

The Resource Management Module 22 is composed of various procedures which allow for the immediate locking, immediate unlocking, event locking, and event unlocking of system resources. This is not a concern if each user has his own equipment on which to execute tasks. However, it becomes a very critical issue when multiple people are sharing select testbeds/devices. For purposes of the present application, event locking and unlocking are techniques which allocate and deallocate resources based on the initiation and termination of a test. The Resource Management Module utilizes the interface between the Test Invocation Module and the System Runner Process to send messages to the System Runner Process.

Within EASY, there are 2 forms of resource management, static and dynamic. The static form of resource management is used to issue a specific request to reserve a testbed without the possibility of sharing. The dynamic form of resource management is used to "share" testbeds amongst two or more users. In both cases, EASY provides the user with a single command to issue resource reserve requests, ats_lock, and a single command to issue resource release requests, ats_unlock. All of the ats_lock and ats_unlock sub-commands use the same syntax, namely:

ats_lock<sub-command><options>
    or
    ats_unlock<sub-command><options>

The -static sub-command is used to extend or release a reservation on a testbed or list of testbeds. This sub-command will prevent any other users from gaining access to a user's testbeds while an automated test run is actually in progress. Resource locking takes place at the time that a task is invoked on the requested resource. The one requirement is that all users are running EASY on the same Unix host. If this requirement is not met, then resource allocation and de-allocation cannot be enforced.

The -dynamic sub-command allows an entirely new method of resource management known as dynamic reservation and releasing. This method allows multiple users to share resources without compromising the task to be executed. It essentially empowers the control of resource allocation and reallocation to the System Runner Process (SRP). This empowerment is task driven, meaning that by registering a task ID or group of task IDs to run on a particular testbed, the system will ensure that the resources are available prior to invoking the task. When the task is complete, the resources are immediately released. This provides a means of "time-sharing" of resources amongst users.

To immediately extend a dynamic reservation for a defined set of tasks on a testbed, the following command may be used:

ats_lock -dynamic -testbed<testbed name> -testids <one or a list of test ids>

When the command is issued, the SRP will check to see if the testbed is a valid resource. This validity check comes from comparing the requested testbed name against all available testbeds specified in the resource file. If this check fails, then a "0" is returned, otherwise a "1" is returned. In either case, the tasks may be scheduled for execution, in one case locking will occur and in the other case it will not. It is up to the user to check the return status of these resource requests to ensure "success" prior to scheduling any tasks to run.

When the first task is ready for execution, the SRP will check to see if the testbed is available. If it is not available, the task will stay in a queue. Periodic checks will be exercised until the resource is available. Upon the successful reservation of the testbed, the first task will begin execution. When the first task has finished, the reservation of the testbed will be released. It will now be made available to any process trying to obtain it. The same sequence is executed for each task registered to run on a given testbed.

Additionally, EASY has a built in facility called "rerun". By default and without any user intervention, this facility automatically produces a synchronous rerun file containing the command names of each of the tasks that have returned a status of FAIL. Any string returned from a task containing a variation of the word fail will be considered a failure causing the rerun facility to be invoked. The command names may include all parameters as well, so as to reproduce the "command" exactly as it originally appeared in the job file.

This is all performed by a programmable Rerun Module 24. All of the commands in the programmable Rerun API follow the following syntax unless otherwise noted:

ats_program<sub-command><options><arguments>.

The user may dynamically extend the behavior of the rerun facility by adding a specific value, string, or regular expression to the internal rerun data structure. This internal rerun data structure is searched upon every task completion. The ats_program sub-command which must be used is -add. The option which must accompany the sub-command is state. The user has two options for specifying additional "state" conditions. The user may add a user definable "state" to all tests in a job, or add it to a specific task in a job.

The user may dynamically alter the behavior of the rerun facility by removing a specific value, string, or regular expression from the internal rerun data structure. This internal rerun data structure is searched upon every task completion. The ats_program subcommand which must be used is -remove. The option which must accompany this sub-command is state. The user has two options for specifying the removal of failed conditions. The user may remove a user definable "state" from all tests in a job, or remove it from specific tests in a job.

Additionally, pre-task instructions may be added to a task or tasks. The option pretask may be used to accomplish this. The user may add pretask instructions for all tasks in a job, or for a specific task in a job. Likewise, the user may remove pre-task instructions for all tasks in a job, or a specific task in a job.

Post-task instructions may be added as well. The option posttask may be used to accomplish this. The user may add post-task instructions for all tasks in a job, or for a specific task in a job. Likewise, the user may remove post-task instructions for all tasks in a job, or a specific task in a job.

There is also a general purpose logging module 26 for writing information to a file. This mechanism is provided to test scripts through the EASY package. The test script writer must first issue a "package require Easy" command to gain access to the logging commands. The command used for general logging is ats_log.

By default, the output written to the log file is preceded by a date/time stamp. The format of this date/time is as follows:

Month day time (AM/PM) Year

All of the general logging commands use the same syntax:

ats_log<keyword><information>

Examples of keywords include -debug (used to write debug data to the log file), -info (used to write information messages to the log file), -warning (used to write warning messages to the log file), and -error (used to write error data to the log file). Additionally, the user has the ability to dynamically change the general log file name and location as well as obtain the complete path name of the general log file being used during the test execution.

A general purpose results logging mechanism is also provided in a Results Logging module 28. The syntax for the Results Logging API commands is:

ats_results<keyword><information>

Possible keywords include the following:

label—indicates what version of the Report Mechanism is being used. This is provided to support versioning, so that when new features are added to the results logging mechanism, that are not supported in prior version, then the label value will change. Thus it allows for multiple version of the results logging facility to exist without requiring the user to change existing scripts.

name—Name of the program file being executed.

script—Name of script/procedure within the file being run.

id—unique test case id.

pargs—All arguments that were passed to the task.

descr—Brief description of test, usually no more than 100 characters.

result—The status/result of the test case.

starttime—Time task was recorded at beginning.

stoptime—Time task was recorded as completing.

tstversion—The version of the test script.

swversion—The software version under test.

hwversion—The hardware version under test.

fwversion—the firmware version under test.

error_info—Any information the user wants to associate with an error condition.

diag—Any information the user wants to log for the purpose of aiding in the script debugability.

comments—Any information the user wants to log which does not fit in the above categories.

get—Retrieves any keyword value previous set.

write—Appends data to the log file.

Additionally, the logging facility allows the user to add their own keywords for recording to the results log file without having to modify any library code. The subcommand used to accomplish this is add. To configure the user defined keyword, the ats_results procedure may be invoked with the keyword name and the value to configure.

A number of advanced features have also been added to the results logging API which assist the user in reporting results from within a complex environment. Most of these features will not be used by the average user. These advanced features include creating a log element (an internal means of identifying a unique instance of storable data), copying a log element, removing a log element, restoring a removed log element, changing the focus of the logging facility (changing the reference amongst multiple logging elements so that different elements' data can be changed from within the same script), and advanced writing features, such as recording data of the latest task or recording data of a specific task. A private internal variable for identifying log element uniqueness is provided in the form of a task index, which is a numerical value beginning at zero and is the first element of a 2 dimensional array, where the second element of the array is the name of the variable to store.

Additionally, the user is able to dynamically change the results log file name and location and obtain the complete path name of the results log file being used during test execution.

A built in event registration facility 30 is also provided. This facility provides the user with a means of programming an event to occur if a user specified return condition is satisfied. For example, this mechanism would be used if a clean script should be run after each script has returned a value of "fail". However, this return value/condition does not necessarily have to reflect the status of a test script, it could be any value the user wishes to return as a test exit code. All of the commands in the programmable Event Registration API have the following syntax:

ats_program -event<sub-command><options><arguments>

The user may dynamically extend the behavior of the event registration facility by adding a specific value, string, or regular expression to the internal event handler data structure. This internal event handler data structure is searched upon every task completion. The ats_program sub-command which is used is -add. The option which accompanies this sub-command is state. The user has two options for specifying additional state conditions, adding a user definable event to all tasks in a job and adding a user definable task to a specific task in a job. The user may also dynamically alter the behavior of the event registration by removing a specific value, string, or regular expression from the internal event handler data structure. This internal event handler data structure is searched upon every task completion. The ats_program sub-command which is used is -remove. The option which accompanies this sub-command is state. The user has two options for specifying the removal of failed conditions, removing a user definable event from all tasks in a job, and removing a user definable event from a specific task in a job.

A Pausing/resume API may also be provided to allow a user to suspend a test being run, and resume the test later on. Obviously, this API has many practical applications during the running of tests.

The present invention also provides the user with a mechanism of interrogating the system while jobs and tests are running to monitor, query, and interact with a test run in real-time. This mechanism is called the System Viewer Module 32. This facility will initially provide the user with a means of obtaining job and test related information, as well as pausing and resuming task execution by invocation of the pausing/resuming API.

The ats_sysview command is provided as the user interface to starting the system viewer. There are two supported modes of operation, interactive and command driven.

The command driven syntax is:

ats_sysview<command><options>

While the interactive syntax is simply:

ats_sysview with no arguments.

Possible options include -h (to generate a usage message), -host (to optionally information the System Viewer what host the SRP is running on, and -port (to inform the System Viewer what port number the SRP is running on. The system viewer communicates with a specific SRP. The SRP maintains information about the environment and task execution for querying purposes. This communication link is established using sockets. Messages are sent between these processes with the intention of obtaining the necessary information.

A mechanism may also be provided which allows for the cleaning of testbeds prior to running test. This may be run as part of an initialization routine before a test is performed.

A Report Generation Module 34 may also be provided. This allows the system to generate a report after each job file has completed execution. This Report Generation module 34 may provide the user with ability to see summary or detailed reports regarding the tasks, as well as customize the type of reporting that is performed. Additionally, an Archive Module 36 to save console log files, the job files, the results log, and the report file (or any combination thereof) in a file for later use.

Upon completion of the job file, the execution harness may prepare a "summary report" which provides an overview of the test run.

While these modules are designed to seamlessly work together, many embodiments are available where less than all of the modules mentioned are utilized. There are numerous combinations of two or more of the modules, and each conceivably comprises a different embodiment of the present invention.

Communications between modules may vary in accordance with the performance of the various modules. For communication between the Test Invocation Module and the System Runner Process, a bi-directional and socket based link is established where the Test Invocation Module sends the request to the System Runner Procedure and the System Runner Procedure handles the requests and returns a reply message.

For communication between the Test Runner Procedure and the System Runner Procedure, a bi-directional and socket based link is established where the System Runner Procedure invokes the Test Runner Procedure and sends requests and receives status information in return.

For communication between the Test Runner Procedure and the test scripts, a bi-directional and pipe based link is established where the Test Runner Procedure invokes processes to run the scripts based on user requests. The Test Runner Procedure sends requests and receives status information in return.

For communication between the System Viewer Module and the System Runner Procedure, a bi-directional and socket based link is established where the System Viewer Module sends requests to the System Runner Procedure and receives status information in return.

For communication between the Resource Manager Module and the System Runner Procedure, a bi-directional and procedure based link is established where the System Runner Procedure makes resource allocation procedure calls to the Resource Manager Module to request resources for dedicated usage and receives status information in return. Although the connection is bi-directional, no request messages are sent from the RSM to the SRM.

Figure 2:
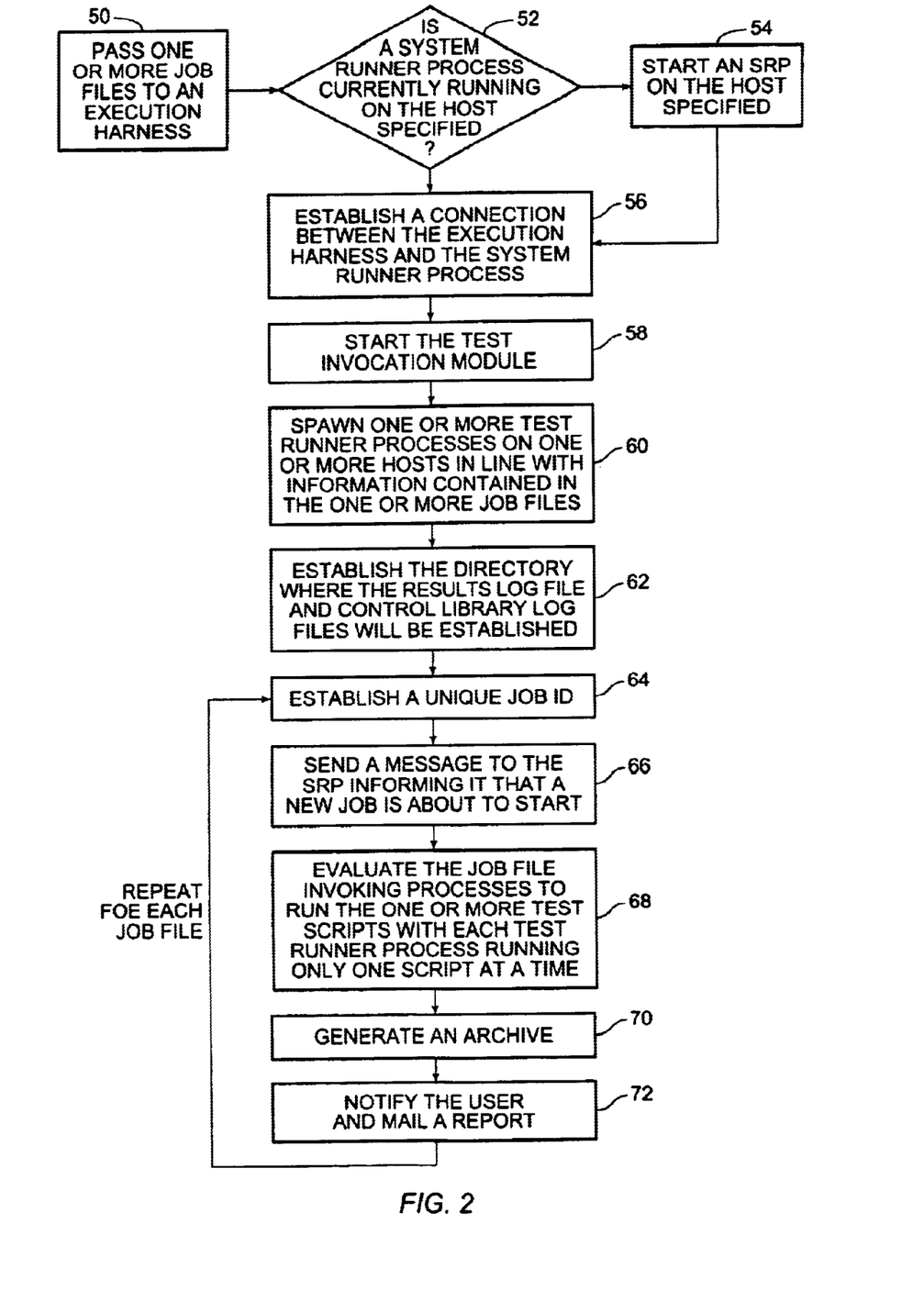
FIG. 2 is a flow diagram illustrating a method for automatic execution of one or more test scripts in accordance with a presently preferred embodiment of the present invention.

FIG. 2 is a flow diagram illustrating a method for automatic execution of one or more test scripts in accordance with a presently preferred embodiment of the present invention. At 50, one or more job files is passed to an execution harness, the one or more job files containing information as to how and where the test scripts should be executed, including on which host a system runner procedure should be executed. The job files may also contain additional information, such as how many test runner processes should be invoked. At 52, the execution harness determine is a system runner process is currently running on the host specified in the one or more job files by checking to see if an SRP is currently running on the particular host. If one is not, at 54, an SRP is started. Then, at 56, a connection is established between the execution harness and the system runner process.

At 58, the test invocation module is started. At 60, one or more test runner processes are spawned on one or more hosts in line with information contained in the one or more job files. At 62, the directory where the results log file and control library log files will reside is established. At this point, a loop may be started with the execution harness repeating the loop for each job file. At 64, a unique job id is established. At 66, a message is sent to the SRP informing it that a new job is about to start. At 68, the job file is evaluated, which involves invoking processes to run the one or more test scripts, with each test runner process running only one test script at a time. At 70, an archive is generated. At 72, the user is notified and the report is mailed. 64 through 72 are repeated for each job file.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for automatic execution of one or more test scripts, comprising:

passing one or more job files to an execution harness, the one or more job files containing information as to how and on which host the test scripts should be executed, and on which host a system runner procedure should be executed;

determining if a system runner process is currently running on the host specified in the one or more job files;

starting and running a system runner process on the host if the host is not currently running a system runner process;

establishing a connection between the execution harness and the system runner process;

spawning one or more test runner processes on one or more hosts in accordance with the information contained in the one or more job files; and invoking processes to run the test scripts, each test runner process running only one test script at a time.

2. The method in accordance with claim 1, wherein said one or more job files contain information on how many test runner processes should be invoked.

3. The method in accordance with claim 1, wherein the system runner process handles at least one of:

actual connection management;

remote/local task executions;

task scheduling;

resource management;

message handling for support processes; and task status for real-time querying purposes.

4. The method in accordance with claim 1, wherein said connection between said execution harness and said system runner process is socket based.

5. The method in accordance with claim 1, wherein said spawning comprises:

determining how many test runner processes to spawn and where to spawn the test runner processes using a test invocation module with the one or more job files.

6. The method in accordance with claim 5, further comprising:

staggering, using a test invocation module, test execution over time.

7. The method in accordance with claim 5, wherein the test invocation module uniquely identifies each task.

8. The method in accordance with claim 1, further comprising:

suspending, using a test invocation module, processing of a job file until a requested task finishes or a user specified timeout period expires.

9. The method in accordance with claim 1, further comprising:

providing status information using a test invocation module.

10. The method in accordance with claim 1, further comprising:

maintaining a synchronous rerun file containing the command names of tasks performed that have failed by utilizing a rerun module.

11. The method in accordance with claim 10, wherein said rerun module is programmable by a user so that said user may alter which tasks are flagged as having failed.

12. The method in accordance with claim 1, further comprising:

logging the test script running process in a file using a general purpose logging module.

13. The method in accordance with claim 12, wherein said general purpose logging module writes debug data to said file.

14. The method in accordance with claim 12, wherein said general purpose logging module writes information messages to said file.

15. The method in accordance with claim 12, wherein said general purpose logging module writes warning messages to said file.

16. The method in accordance with claim 12, wherein said general purpose logging module writes error messages to said file.

17. The method in accordance with claim 1, further comprising:

logging the results of the running of the one or more test scripts in a file.

18. The method in accordance with claim 1, further comprising pausing one or more of the test scripts while they are running.

19. The method in accordance with claim 1, further comprising:

interrogating said system runner process while jobs and tests are running to monitor, query, and interact with a test run in real-time.

20. The method in accordance with claim 1, further comprising:

generating a report after each job file has finished execution.

21. The method in accordance with claim 1 further comprising:

saving console log files, job files, results log, and/or report files in a file for later use.

22. The method in accordance with claim 1, further comprising:

managing system resources such that the system resources are shared by a plurality of users conducting respective tests.

23. The method in accordance with claim 22, wherein said managing system resources comprises:

immediately locking testbeds;

immediately unlocking testbeds;

event-locking testbeds; and event-unlocking testbeds.

24. The method in accordance with claim 22, wherein said managing system resources comprises:

using the connection between said execution harness and the system runner process to send messages to the system runner process.

25. The method in accordance with claim 22, wherein said managing system resources comprises:

reserving a testbed in response to a request from a user before invoking a task to be executed using the testbed; and releasing the testbed when the task is completed, making the testbed available to another user.

26. The method in accordance with claim 25, wherein said managing system resources further comprises:

placing tasks to be executed on a specific testbed in a queue;

periodically checking said testbed to see if it is available; and releasing said testbed for use by the task at the front of the queue when it is available.

27. The method in accordance with claim 25, wherein said managing system resources comprises:

registering a task ID or a group of task IDs to run on a particular testbed.

28. The method in accordance with claim 1, further comprising:

selecting, using a test invocation module, a specific type of task execution from among at least two of direct task execution, synchronous task execution, asynchronous task execution, parallel task execution, and on-process task execution.

29. A program storage device readable by a machine, tangibly embodying a program of instructions executable by the machine to perform method steps automatic execution of one or more test scripts, the method steps comprising:

passing one or more job files to an execution harness, the one or more job files containing information as to how and on which host the test scripts should be executed, and on which host a system runner procedure should be executed;

determining if a system runner process is currently running on the host specified in the one or more job files;

starting and running a system runner process on the host if the host is not currently running a system runner process;

establishing a connection between the execution harness and the system runner process;

spawning one or more test runner processes on one or more hosts in accordance with the information contained in the one or more job files; and invoking processes to run the test scripts, each test runner process running only one test script at a time.

30. The program storage device in accordance with claim 29, wherein said method further comprises:

selecting, using a test invocation module, a specific type of task execution from among at least two of direct task execution, synchronous task execution, asynchronous task execution, parallel task execution, and on-process task execution.

31. The program storage device in accordance with claim 29, wherein said one or more job files contain information on how many test runner processes should be invoked.

32. The program storage device in accordance with claim 29, wherein the system runner process handles at least one of:

actual connection management;
remote/local task execution;
task scheduling;
resource management;
message handling for support processes; and
task status for real-time querying purposes.

33. The program storage device in accordance with claim 29, wherein said connection between said execution harness and said system runner process is socket based.

34. The program storage device in accordance with claim 29, wherein said spawning comprises:

determining how many test runner processes to spawn and where to spawn the test runner processes using a test invocation module with the one or more job files.

35. The program storage device in accordance with claim 34, wherein said method further comprises:

staggering, using the test invocation module, test execution over time.

36. The program storage device in accordance with claim 34, wherein the test invocation module uniquely identifies each task.

37. The program storage device in accordance with claim 29, wherein said method further comprises:

suspending, using a test invocation module, processing of a job file until a requested task finishes or a user specified timeout period expires.

38. The program storage device in accordance with claim 29, wherein said method further comprises:

providing status information using a test invocation module.

39. The program storage device in accordance with claim 29, wherein said method further comprises:

managing system resources such that the system resources are shared by a plurality of users conducting respective tests.

40. The program storage device in accordance with claim 39, wherein said managing system resources comprises:

registering a task ID or a group of task IDs to run on a particular testbed.

41. The program storage device in accordance with claim 39, wherein said managing system resources comprises:

immediately locking testbeds;
immediately unlocking testbeds;
event-locking testbeds; and
event-unlocking testbeds.

42. The program storage device in accordance with claim 39, wherein said managing system resources comprises:

using the connection between said execution harness and said system runner process to send messages to the system runner process.

43. The program storage device in accordance with claim 39, wherein said managing system resources comprises:

reserving a testbed in response to a request from a user before invoking a task to be executed using the testbed; and releasing the testbed when the task is completed, making the testbed available to another user.

44. The program storage device in accordance with claim 43, wherein said managing system resources further comprises:

placing tasks to be executed on a specific testbed in a queue;

periodically checking said testbed to see if it is available; and releasing said testbed for use by the task at the front of the queue when it is available.

45. The program storage device in accordance with claim 29, wherein said method further comprises:

maintaining a synchronous rerun file containing the command names of tasks performed that have failed by utilizing a rerun module.

46. The program storage device in accordance with claim 45, wherein said rerun module is programmable by a user so that said user may alter which tasks are flagged as having failed.

47. The program storage device in accordance with claim 29, wherein said method further comprises:

logging the test script running process in a file using a general purpose logging module.

48. The program storage device in accordance with claim 47, wherein said general purpose logging module writes debug data to said file.

49. The program storage device in accordance with claim 47, wherein said general purpose logging module writes information messages to said file.

50. The program storage device in accordance with claim 47, wherein said general purpose logging module writes warning messages to said file.

51. The program storage device in accordance with claim 47, wherein said general purpose logging module writes error messages to said file.

52. The program storage device in accordance with claim 29, wherein said method further comprises:
  logging the results of the running of the one or more test scripts in a file.

53. The program storage device in accordance with claim 29, wherein said method further comprises:
  pausing one or more of the test scripts while they are running.

54. The program storage device in accordance with claim 29, wherein said method further comprises:
  interrogating said system runner process while jobs and tests are running to monitor, query, and interact with a test run in real-time.

55. The program storage device in accordance with claim 29, wherein said method further comprises:
  generating a report after each job file has finished execution.

56. The program storage device in accordance with claim 29, wherein said method further comprises:
  saving console log files, job files, results log, and/or report files in a file for later use.

57. An extensible automated system for running test scripts comprising:
  one or more job files, said one or more job files containing information as to how and where the test scripts should be executed, comprising on which host a system runner procedure should be executed;
  an execution harness coupled to said one or more job files;
  a system runner procedure coupled to said execution harness;
  at least one test runner procedure coupled to said system runner procedure, each test runner procedure capable of running a test script.

58. The extensible automated system in accordance with claim 57, further comprising:
  a resource manager module coupled to said system runner procedure, said resource manager managing system resources such that the system resources are shared by a plurality of users conducting respective tests.

59. The extensible automated system in accordance with claim 57, further comprising a system viewer module coupled to said system runner procedure.

60. The extensible automated system in accordance with claim 59, wherein said system viewer module is coupled to said system runner procedure via a socket-based link.

61. The extensible automated system in accordance with claim 57, further comprising:
  a results logging module coupled to said one or more test runner procedures.

62. The extensible automated system in accordance with claim 57, further comprising:
  a general purpose logging module coupled to said one or more test runner procedures.

63. The extensible automated system in accordance with claim 57, further comprising:
  a report generation module coupled to said execution harness.

64. The extensible automated system in accordance with claim 57, further comprising:
  an archive module coupled to said execution harness.

65. The extensible automated system in accordance with claim 57, wherein said system runner procedures and said one or more test runner procedures are coupled via a socket-based link.

66. The extensible automated system in accordance with claim 57, wherein said resource manager module is coupled to said system runner procedure via a procedure-based link.

67. The extensible automated system in accordance with claim 57, further comprising:
  a test invocation module coupled to said execution harness and to said system runner procedure, said test invocation module allowing to select a specific type of task execution from among at least two of direct task execution, synchronous task execution, asynchronous task execution, parallel task execution, and on-process task execution.

68. The extensible automated system in accordance with claim 67, wherein said test invocation module is coupled to said system runner procedure via a socket-based link.

69. An apparatus for automatic execution of one or more test scripts, said apparatus comprising:
  means for passing one or more job files to an execution harness, the one or more job files containing information as to how and on which host the test scripts should be executed, and on which host a system runner procedure should be executed;
  means for determining if a system runner process is currently running on the host specified in the one or more job files;
  means for starting and running a system runner process on the host if the host is not currently running a system runner process;
  means for establishing a connection between the execution harness and the system runner process;
  means for spawning one or more test runner processes on one or more hosts in accordance with the information contained in the one or more job files; and
  means for invoking processes to run the test scripts, each test runner process running only one test script at a time.

70. The apparatus in accordance with claim 69, further comprising:
  means for selecting, using a test invocation module, a specific type of task execution from among at least two of direct task execution, synchronous task execution, asynchronous task execution, parallel task execution, and on-process task execution.

71. The apparatus in accordance with claim 69, wherein said one or more job files contain information on how many test runner processes should be invoked.

72. The apparatus in accordance with claim 69, further comprising:
  means for running the system runner process.

73. The apparatus in accordance with claim 72, wherein said means for running the system runner process comprises at least one of:
  means for managing actual connection;
  means for executing remote/local tasks;
  means for scheduling tasks;
  means for managing system resources;
  means for handling messages for support processes; and
  means for real-time querying task status.

74. The apparatus in accordance with claim 69, wherein said connection between said execution harness and said system runner process is socket based.

75. The apparatus in accordance with claim 69, wherein said means for spawning comprises:
means for determining how many test runner processes to spawn and where to spawn the test runner processes using a test invocation module with one or more job files.

76. The apparatus in accordance with claim 75, further comprising:
means for staggering, using the test invocation module, test execution over time.

77. The apparatus in accordance with claim 75, wherein the test invocation module uniquely identifies each task.

78. The apparatus in accordance with claim 69, further comprising:
means for suspending, using a test invocation module, processing of a job file until a requested task finishes or a user specified timeout period expires.

79. The apparatus in accordance with claim 69, further comprising:
means for providing status information using a test invocation module.

80. The apparatus in accordance with claim 61, further comprising:
means for managing system resources such that the system resources are shared by a plurality of users conducting respective tests.

81. The apparatus in accordance with claim 80, wherein said means for managing system resources comprises:
means for immediately locking testbeds;
means for immediately unlocking testbeds;
means for event-locking testbeds; and
means for event-unlocking testbeds.

82. The apparatus in accordance with claim 80, wherein said means for managing system resources comprises:
means for using the connection between said execution harness and said system runner process to send messages to the system runner process.

83. The apparatus in accordance with claim 80, wherein said means for managing system resources comprises:
means for reserving a testbed in response to a request from a user before invoking a task to be executed using the testbed; and
means for releasing the testbed when the task is completed, making the testbed available to another user.

84. The apparatus in accordance with claim 83, wherein said means for managing system resources comprises:
means for registering a task ID or a group of task IDs to run on a particular testbed.

85. The apparatus in accordance with claim 83, wherein said means for managing system resources further comprises:
means for placing tasks to be executed on a specific testbed in a queue;
means for periodically checking said testbed to see if it is available; and
means for releasing said testbed for use by the task at the front of the queue when it is available.

86. The apparatus in accordance with claim 69, further comprising:
means for maintaining a synchronous rerun file containing the command names of tasks performed that have failed by utilizing a rerun module.

87. The apparatus in accordance with claim 86, wherein said rerun module is programmable by a user so that said user may alter which tasks are flagged as having failed.

88. The apparatus in accordance with claim 69, further comprising:
means for logging the test script running process in a file using a general purpose logging module.

89. The apparatus in accordance with claim 88, wherein said general purpose logging module writes debug data to said file.

90. The apparatus in accordance with claim 88, wherein said general purpose logging module writes information messages to said file.

91. The apparatus in accordance with claim 88, wherein said general purpose logging module writes warning messages to said file.

92. The apparatus in accordance with claim 88, wherein said general purpose logging module writes error messages to said file.

93. The apparatus in accordance with claim 69, further comprising:
means for logging the results of the running of the one or more test scripts in a file.

94. The apparatus in accordance with claim 69, further comprising:
means for pausing one or more of the test scripts while they are running.

95. The apparatus in accordance with claim 69, further comprising:
means for interrogating said system runner process while jobs and tests are running to monitor, query, and interact with a test run in real-time.

96. The apparatus in accordance with claim 69, further comprising:
means for generating a report after each job file has finished execution.

97. The apparatus in accordance with claim 69, further comprising:
means for saving console log files, job files, results log, and/or report files in a file for later use.

* * * * *

UNITED STATES PATENT AND TRADEMARK OFFICE
CERTIFICATE OF CORRECTION

PATENT NO. : 6,708,324 B1
DATED : March 16, 2004
INVENTOR(S) : Jeffrey P. Solloway, Jay W. Yang and Ying He It is certified that error appears in the above-identified patent and that said Letters Patent is hereby corrected as shown below:

Column 4,
Line 29, replace "(ats_run)" with -- *(ats_run)* --.
Lines 29 and 33, replace "ats_run" with -- *ats_run* --.
Lines 31 and 32, replace "ats_run<sub-command><options><task name><parameters>" with -- *ats_run<sub-command><options><task name><parameters>* --.
Line 42, replace "-sync" with -- *-sync* --.
Line 43, replace "-async" with -- *-async* --.
Line 44, replace "-par" with -- *-par* --.
Line 45, replace "-on_proc" with -- *-on_ proc* --.
Line 50, replace "host<hostnames>" with -- *host<hostnames* --.

Column 5,
Line 5, replace "-host<host_name> " with -- *-host<host_name>* --.
Line 6, replace "-delay<value>" with -- *-delay<value>* --.
Line 6, replace "-tid<task id>" with -- *-tid<task id>* --.
Lines 6 and 12, replace "-host" with -- *-host* --.
Line 19, replace "-delay" with -- *-delay* --.
Line 22, replace "-tid" with -- *-tid* --.
Lines 30, 31 and 43, replace "-wait" with -- *-wait* --.
Line 31, replace "-query" with -- *-query* --.
Line 44, replace "ats_run –wait [-timeout<value in seconds>]" with -- *ats_run –wait [-timeout<value in seconds>]* --.
Line 45, replace "[-interval<interval value>]" with -- *[-interval<interval value>]* --.
Line 46, replace "<list of task handles>" with -- *<list of task handles>* --.
Lines 47 and 49, replace "-query" with -- *-query* --.
Line 50, replace "ats_run –query<task handles><keyword>" with -- *ats_run –query<task handles><keyword>* --.
Line 51, replace "status" with -- *status* --.
Line 52, replace "startTime" with -- *startTime* --.
Line 52, replace "endTime" with -- *endTime* --.
Line 53, replace "retVal" with -- *retVal* --.
Line 54, replace "tclError" with -- *tclError* --.
Line 55, replace "tclErrorMsg" with -- *tclErrorMsg* --.

Column 6,
Line 9, replace "ats_" with -- *ats_* --.
Line 10, replace "lock" with -- *lock* --.
Line 11, replace "ats_unlock" with -- *-ats_unlock* -- (both occurrences).
Line 11, replace "ats_lock" with -- *ats_lock* --.
Line 13, replace "ats_lock<sub-command><options>" with -- *ats_lock<sub-command><options>* --.

UNITED STATES PATENT AND TRADEMARK OFFICE
CERTIFICATE OF CORRECTION

PATENT NO. : 6,708,324 B1
DATED : March 16, 2004
INVENTOR(S) : Jeffrey P. Solloway, Jay W. Yang and Ying He It is certified that error appears in the above-identified patent and that said Letters Patent is hereby corrected as shown below:

Column 6 (cont'd),
Line 15, replace "ats_unlock<sub-command><options>" with -- *ats_unlock<sub-command><options>* --.
Line 16, replace "static" with -- *static* --.
Lines 41 and 42, replace "ats_lock –dynamic –testbed<testbed name> -testids <one or a list of test ids>" with -- *ats_lock –dynamic –testbed<testbed name> -testids <one or a list of test ids>* --.

Column 7,
Line 8, replace "ats_program<sub-command><options><arguments>." with -- *ats_program <sub-command><options><arguments >* --.
Line 13, replace "ats_program>" with -- *ats_program* --.
Line 13, replace "-add" with -- *-add* - -
Lines 15 and 24, replace "state" with -- *state* --.
Line 22, replace "ats_program" with -- *ats_program* --.
Line 23, replace "-remove" with -- *-remove* --.
Line 29, replace "pretask" with -- *pretask* --.
Line 35, replace "posttask" with -- *posttask* --.
Line 44, replace ats_log" with -- *ats_log* --.
Line 49, replace "ats_log<keyword><information>" with
-- *-ats_log<keyword><information>* --.
Line 50, replace "-debug" with -- *-debug* --.
Line 51, replace "-info" with -- *-info* --.
Line 52, replace "-warning" with -- *-warning* --.
Line 53, replace "-error" with -- *-error* --.
Line 61, replace "ats_results<keyword><information>" with -- *ats_results<keyword><information>* --.
Lines 64, replace "label" with -- *label* --.

Column 8,
Line 4, replace "name" with -- *name* --.
Line 5, replace "script" with -- *script* --.
Line 8, replace "id" with -- *id* --.
Line 9, replace "pargs" with -- *pargs* --.
Line 10, replace "descr" with -- *descr* --.
Line 12, replace "result" with -- *result* --.
Line 13, replace "starttime" with -- *starttime* --.
Line 14, replace "stoptime" with -- *stoptime* --.
Line 15, replace "tstversion" with -- *tstversion* --.
Line 16, replace "swversion" with -- *swversion* --.
Line 17, replace "hwversion" with -- *hwversion* --.

UNITED STATES PATENT AND TRADEMARK OFFICE
CERTIFICATE OF CORRECTION

PATENT NO. : 6,708,324 B1
DATED : March 16, 2004
INVENTOR(S) : Jeffrey P. Solloway, Jay W. Yang and Ying He It is certified that error appears in the above-identified patent and that said Letters Patent is hereby corrected as shown below:

Column 8 (cont'd),
Line 18, replace "fwversion" with -- *fwversion* --.
Line 19, replace "error info" with -- *error_ info* --.
Line 21, replace "diag" with -- *diag* --.
Line 23, replace "comments" with -- *comments* --.
Line 25, replace "get" with -- *get* --.
Line 26, replace "write" with -- *write* --.
Line 32, replace "add" with -- *add* --.
Line 33, replace "ats_results" with -- *ats_results* --.
Lines 66 and 67, replace "ats_program –event<sub-command><options><argu-ments>"
with -- *ats_program –event<sub-command><options><argu-ments>* --.

Column 9,
Lines 5 and 15, replace "ats_program" with -- *ats_program* --.
Line 6, replace "-add" with -- *-add* --.
Lines 7 and 17, replace "state" with -- *state* --.
Line 16, replace "-remove" with -- *-remove* --.
Lines 33 and 39, replace "ats_sysview" with -- *ats_sysview* --.
Line 37, replace "ats_sysview<command><options>" with
-- *ats_sysview<command><options>* --.
Line 41, replace "-h" with -- *-h* --.
Line 42, replace "host" with -- *host* --.
Line 43, replace "-port" with -- *-port* --.

Signed and Sealed this

Second Day of November, 2004

JON W. DUDAS
*Director of the United States Patent and Trademark Office*